United States Patent [19]

Cumming

[11] 4,346,791

[45] Aug. 31, 1982

[54] FRICTION BRAKE

[75] Inventor: James C. Cumming, Pleasant Ridge, Mich.

[73] Assignee: Rockwell International Corporation, Pittsburgh, Pa.

[21] Appl. No.: 193,511

[22] Filed: Oct. 2, 1980

[51] Int. Cl.$^3$ ............................................. F16D 55/40
[52] U.S. Cl. ................................... 188/71.5; 188/72.4
[58] Field of Search .................... 188/71.5, 72.3, 72.4, 188/170; 192/70.11

[56] References Cited

U.S. PATENT DOCUMENTS 3,195,692 7/1965 Herr et al. ............................ 188/170
3,500,970 3/1970 Schilling .............................. 188/170

FOREIGN PATENT DOCUMENTS 1915651 10/1970 Fed. Rep. of Germany ..... 188/71.5

Primary Examiner—Duane A. Reger

[57] ABSTRACT

An improved brake for a wheel mounted on a spindle is of the type which includes a housing secured to the spindle with a plurality of brake discs carried by the housing for relative rotation therewith. A plurality of reaction plates are carried by the hub of the wheel for relative rotation therewith and the discs and plates are intervened in an alternating fashion to define a pack. The housing has a central bore defined by an interior cylindrical surface and a radially, inwardly extending annular wall. A piston has a tubular portion with a cylindrical outer surface and a radially, outwardly extending wall with an annular surface thereon. The piston is axially, slidably mounted in the bore with the annular wall, the interior cylindrical surface, the exterior cylindrical surface and the annular surface defining an expandable chamber between the bore and the piston. A first, generally U-shaped expandable seal is in the chamber and seated against the annular wall of the bore with a pair of lips making sliding, sealing contact with the cylindrical surfaces. A similar second generally U-shaped expandable seal is in the chamber and seated against the annular surface of the piston to also make sliding, sealing contact with the cylindrical surfaces. Hydraulic fluid is selectively introduced to and discharged from the chamber to produce selective movement of the piston axially relative to the bore to cause it to produce a compressive force on the pack.

5 Claims, 3 Drawing Figures

FRICTION BRAKE

BACKGROUND OF THE INVENTION

1. Field of the Invention

This invention relates to a multi-disc friction brake and, more specifically, to such a brake which includes an actuation piston and bore configuration which is simple and less expensive to provide.

2. Description of the Prior Art

There have heretofore been utilized a number of friction brakes which employ a plurality of relatively rotating friction discs and a means for applying compressive forces therebetween to produce the braking action. Some such friction brakes as those disclosed in U.S. Pat. Nos. 3,927,737; 3,941,219; and 4,146,116, utilize a circular actuation piston which has a cross-section at one side thereof which is generally L-shaped. Other brake configurations, such as those disclosed in U.S. Pat. Nos. 3,132,724 and 3,198,295, use a circular piston which is generally annular. Still other friction brakes, such as those disclosed in U.S. Pat. Nos. 3,081,842; 3,301,359; and 4,173,269, employ actuation pistons which have at one side thereof a generally T-shaped cross-section.

While the actuation piston devices in each of these friction brakes include a number of features which are quite different, there remains a common problem of manufacturing tolerances and general engineering manufacturing instructions in the formation of each which contributes significantly to the overall expense and complexity of manufacturing these brakes. In general, their manufacture includes a common concern for the tolerances of various diameters, the tolerances regarding concentricity of various surfaces, the smoothness of various surfaces during final machining and the tolerances and dimensions of piston or quad ring grooves formed in the surfaces.

SUMMARY OF THE INVENTION

It is therefore an object of this invention to provide an improved friction brake having an actuation piston and bore configuration which is simple and less expensive to manufacture.

These and other objects of the invention are provided in a preferred embodiment thereof which includes an improved brake for relatively rotating first and second members of the type which includes a housing secured to the first member. A plurality of brake discs are carried by the housing for relative rotation therewith and axial movement therein. A plurality of reaction plates are carried by the second member for relative rotation therewith and axial movement thereon. The discs and the plates are intervened in alternating fashion to define a pack. The improvement includes the housing having a central bore defined by a radially, inwardly extending annular wall and an interior cylindrical surface. A piston has a tubular portion with a cylindrical outer surface and a radially, outwardly extending wall having an annular surface extending outwardly from the cylindrical outer surface. The piston is axially, slidably mounted in the bore with the annular wall, the interior cylindrical surface, the exterior cylindrical surface and the annular surface defining an expandable chamber between the bore and the piston. A first generally U-shaped expandable seal in the chamber is seated against the annular wall of the bore and has a pair of lips capable of respectively making sliding, sealing contact with the interior cylindrical surface and the exterior cylindrical surface. A second generally U-shaped expandable seal in the chamber is seated against the annular surface of the piston and has a pair of lips capable of respectively making sliding, sealing contact with the interior cylindrical surface and the exterior cylindrical surface. There is means for selectively introducing hydraulic fluid to and discharging hydraulic fluid from an intermediate region of the chamber between the first and second seals. The hydraulic fluid is sealing retained therein by the first and second seals and capable of acting on the piston for selective movement of the piston axially relative to the bore. There is also means for providing a compressive braking force to the pack which is responsive to the selective movement of the piston.

DETAILED DESCRIPTION OF THE PREFERRED EMBODIMENTS

Figure 1:
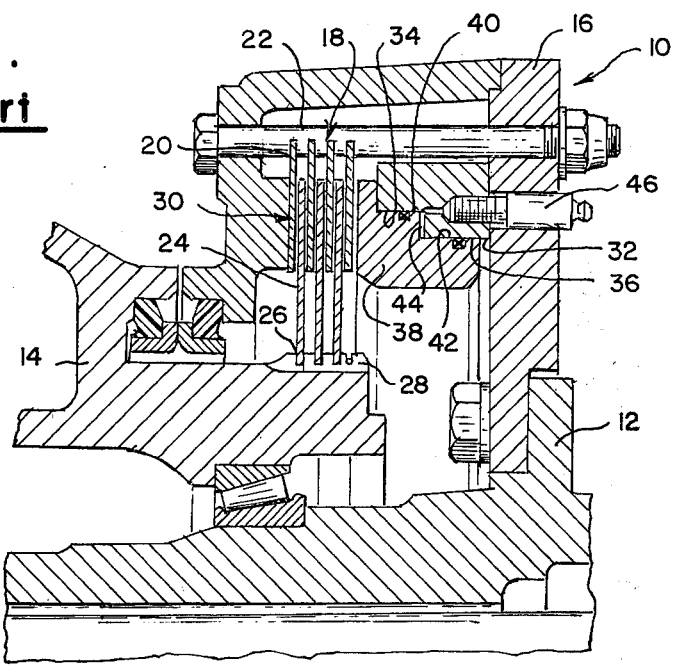
FIG. 1 is a sectional side view of a simplified prior art configuration.

As seen in FIG. 1, a prior art brake 10 is presented to demonstrate the type of critical engineering instructions and tolerances which have been required in the manufacture of one of the prior art brakes. Although the brake 10 is similar to that disclosed in U.S. Pat. No. 4,146,116, a similar analysis and explanation of the types of brakes disclosed in the other patents mentioned hereinabove could be made to demonstrate the advantages of the present invention. However, the explanation of the prior art brake 10 to be presented herein should enable one skilled in the brake art to understand how similar engineering instructions and tolerances which are critical to insure proper brake operation will also be required in the formation and manufacture of these other types of brakes.

The prior art brake 10 is utilized to provide a braking force to prevent or reduce relative rotation of two members in the form of an axle spindle 12 and a hub 14 of a wheel mounted for rotation thereabout. A housing 16 of the brake 10 is mounted on the spindle 12 and includes a plurality of brake discs 18 therein. The brake discs 18 are mounted in the housing 16 by each disc 18 being provided a plurality of grooves 20 which are keyed to a plurality of axially extending bolts 22 in the housing 16 to allow limited axial movement within the housing while preventing any relative rotation therebetween. A plurality of reaction plates 24 are carried by the wheel hub 14 as a splined opening 26 therethrough is received on a splined portion 28 of the hub 14. Mounted in this manner, the reaction plates 24 will rotate with the hub 14 while being capable of limited axial movement relative thereto. The discs 18 and the plates 24 are intervened in an alternating fashion to define a pack 30 of friction elements capable of producing the desired frictional braking force therebetween when a compressive force is applied to the pack.

To produce the desired compressive force the housing 16 includes a central bore 32 having a generally L-shaped cross-section at each side thereof. The bore 32 is therefore defined by two major structural portions to include a first interior cylindrical surface 34 and a second interior cylindrical surface 36. A piston 38 is mounted in the bore 32 and is also provided a generally L-shaped cross-section at each side thereof. The piston 38 has a first exterior cylindrical surface 40 which has a larger diameter than a second exterior cylindrical surface 42. The cylindrical surface 40 is dimensioned to make sliding contact with the interior cylindrical surface 34 of the bore 32 and the exterior cylindrical surface 42 is dimensioned to make sliding contact with the interior cylindrical surface 36 of the bore 32.

With the piston 38 mounted for sliding contact within the bore 32, an expandable chamber 44 is defined therebetween. An oil fitting and passageway 46 in the housing 16 allows hydraulic fluid (from a source not shown in FIG. 1) to be selectively introduced to and discharged from the expandable chamber 44 for the desired selective axial movement of the piston 38 relative to the bore 32 and housing 16. The piston 38 is aligned with the pack 30 so that its axial movement will produce a compressive force on the pack 30 which will result in the desired braking action as frictional forces are generated between the relatively rotating discs 18 and plates 24.

Figure 2:
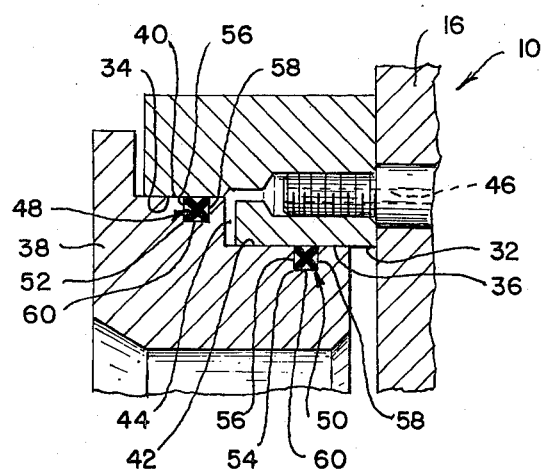
FIG. 2 is an enlarged view of the piston and bore area of the prior art configuration shown in FIG. 1.

As seen in FIG. 2, to insure proper sealing of the expandable chamber 44, the piston 38 is provided some form of expandable or resilient sealing means at the cylindrical surfaces 40, 42. Although the prior art brake 10 utilizes quad rings 48 and 50, any number of various types of piston rings might be utilized for this purpose. To properly mount the quad rings 48, 50, the cylindrical surfaces 40, 42 are respectively provided circular grooves 52, 54 for the installation of the quad rings therein.

It should be clear that the proper operation of the brake 10 requires a number of critical manufacturing steps in the formation of the bore 32 and piston 38 to provide a properly sealed expandable chamber 44. As seen in FIG. 2, the critical area is enlarged to demonstrate and delineate the particular engineering instructions and tolerances which the prior art brake 10 requires which can then be compared to those requirements in the formation of the preferred brake to be discussed hereinbelow.

In the final machining of the bore 32, there are critical engineering tolerances required in providing a proper diameter for the interior cylindrical surface 34 and a proper diameter for the interior cylindrical surface 36. Additionally, there are tolerance requirements regarding the concentricity of cylindrical surface 34 relative to cylindrical surface 36. Similarly, when the piston 38 is formed, the diameter of the exterior cylindrical surfaces 40, 42 are critical to insure proper mating with the surfaces 34, 36. In a like manner as with the bore 32, the concentricities between the surfaces 40, 42 are also critical. Additionally, with regard to the surfaces 34, 36, 40, 42 there are engineering instructions regarding the final finishing and the acceptable surface smoothness which will be necessary for proper piston operation.

To insure that the quad rings 48, 50 will function properly, the formation of the grooves 52, 54 each require rigid engineering tolerances for the width of the grooves 52, 54 between the side walls 56, 58 thereof and the depth to the base 60 from the cylindrical surface in which the groove is formed. Tolerances between the concentricity of the base 60 and the appropriate surface 40, 42 are also required. Again, a final surface finishing of each groove 52, 54 includes instructions for providing the required smooth surface characteristics of the walls 54, 58 and the base 60 which are essential for proper quad ring operation to properly seal the piston 38 relative to the bore 32.

A summation of all of the critical engineering tolerance requirements mentioned hereinabove with regard to the proper operation of the piston 38 including the various diameters, concentricities, depths, widths and surface smoothness requirements indicate that when manufacturing the prior art brake 10 there must be twenty such instructions. These engineering tolerance and instruction requirements each employ special tool operations and functions and add to the overall cost of the formation and manufacture of the prior art brake 10. In addition to adding to the cost of the formation of such a brake 10, any failure to meet these requirements might result in the rejection of one or more of the above-mentioned parts so that these tolerance requirements may further add to waste and rejection of parts which would again add to the overall manufacturing expenses of such a prior art brake 10.

Figure 3:
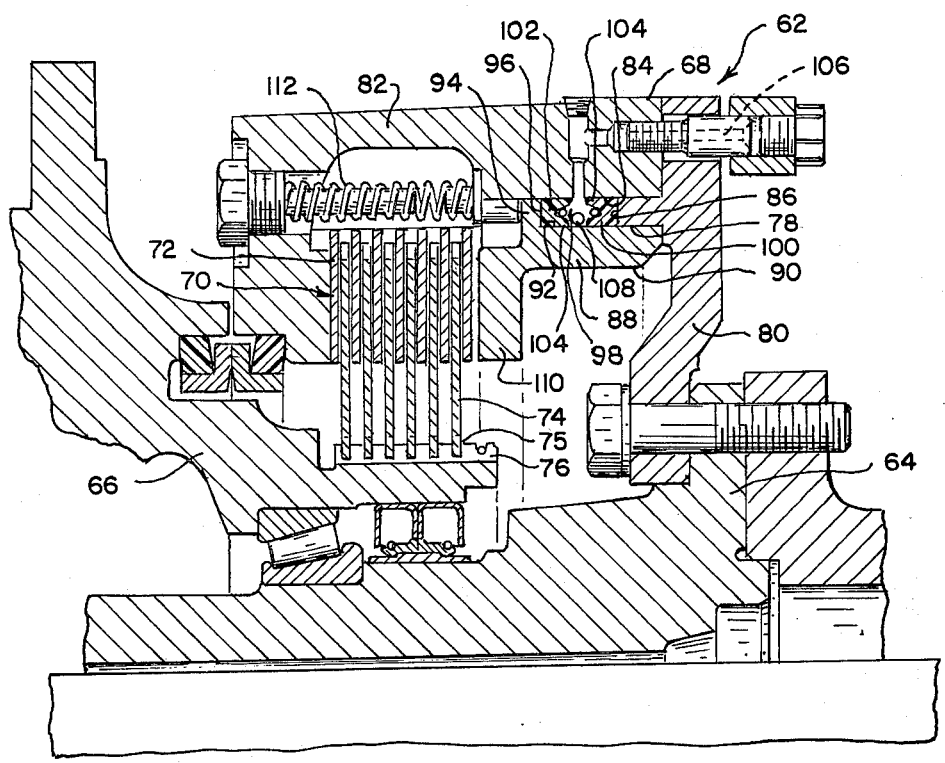
FIG. 3 is a sectional side view of the preferred embodiment of the invention.

As seen in FIG. 3, a preferred brake 62 of the present invention includes some of the features mentioned hereinabove for the prior art brake 10. Specifically, braking is intended to again selectively prevent or reduce relative rotation between a first element and a second element. In the preferred brake 62 the first element is an axle spindle 64 and the second element is the hub 66 of a wheel mounted for rotation relative to the spindle 64. A housing 68 is rigidly secured to the spindle 64 and sealingly encloses a braking pack 70 of friction elements in the form of braking discs 72 and reaction plates 74. Again, the braking discs 72 are mounted in the housing 68 for no relative rotation therebetween but while allowing limited axial movement relative to the housing 68. The reaction discs 74 are mounted for relative rotation with the hub 66 by their being received at a hole 75 therethrough on a splined portion 76 of the hub 66. The mounting of the reaction plates 74 in this manner will allow some axial movement of the reaction plate 74 relative to the hub 66.

The housing 68 includes a bore 78 which is similar to the bore 32 mentioned hereinabove. The bore 78 is formed by the structural combination of a backing plate 80 and a generally cylindrical outer portion 82 of the housing 68 to provide the generally L-shaped structure needed for the bore 78. Specifically, the bore 78 is defined by an interior cylindrical surface 84 on the portion 82 and a radially, inwardly extending annular wall 86 which is an integral portion of the backing plate 80. The piston 88 includes a tubular portion 90 having a cylindrical outer surface 92 and a radially, outwardly extending wall 94 having an annular surface 96 which extends outwardly from the cylindrical outer surface 92.

The piston 88 is axially, slidably mounted in the bore 78 with the annular wall 86, the interior cylindrical surface 84, the exterior cylindrical surface 92 and the annular surface 96 defining an expandable chamber 98 between the bore 78 and the piston 88. To seal the chamber 98 a pair of seals 100, 102 are provided at both ends of the chamber. The seal 100 is of the generally U-shaped expandable type and is seated against the annular wall 86 of the bore 78 and includes a pair of lips 104 which are capable of respectively making sliding, sealing contact with the interior cylindrical surface 84 and the exterior cylindrical surface 92. The seal 102 is of similar construction and is seated against the annular surface 96 of the piston 88 with its pair of lips 104 also being capable of respectively making sliding, sealing contact with the interior cylindrical surface 84 and the exterior cylindrical surface 92.

The housing 68 includes a hydraulic passage 106 therethrough which terminates at an intermediate region of the chamber 98 for the introduction of hydraulic fluid to and the discharge of hydraulic fluid from the chamber 98. The hydraulic fluid is sealing retained within the intermediate region of the chamber 98 between the seals 100, 102 and is capable of acting on the piston 88 for its selective movement axially relative to the bore 78. During installation of the piston 88 and the seals 100, 102 within the bore 78, an O-ring 108 is installed between the seals 100, 102 in the intermediate region of the chamber 98 for the purposes of insuring their separation and proper seating respectively against the wall 86 and the surface 96. During normal operation of the brake 62 the O-ring 108 serves no actual function and will not interfere with the operation of the piston 88. Once the seals 100, 102 are properly seated during the normal operation of the brake 62 they would not be expected to be dislodged and would properly operate to seal the hydraulic fluid introduced to the intermediate region of the chamber 98.

With selective movement of the piston 88, an inwardly extending annular portion 110 of the piston 88 will be brought into contact with the braking pack 70 of friction elements to selectively produce the desired braking action tending to prevent or reduce the relative rotation of the wheel about the spindle 64.

To insure proper repositioning of the piston 88 upon discharge of hydraulic fluid from the chamber 98, a plurality of springs 112 are mounted within the housing 66 in alignment with the piston 88 tending to move it axially relative to the bore 78 away from the pack 70. Obviously, the hydraulic fluid introduced to the chamber 98 for the selective application of the desired braking force is capable of overcoming the biasing effect of the springs 112 to provide sufficient compressive braking force to the pack.

As thus disclosed, the preferred brake 62 includes a system of introducing hydraulic fluid to an expandable chamber which will in turn cause the movement of a piston to directly produce the desired braking force. However, it should be well known to those who are skilled in the braking art that in some installations it is desirable to have a positive braking force on a pack which can be selectively removed by the introduction of hydraulic fluid. In these installations a spring or other biasing means is mounted within the housing to normally apply the braking force and hydraulic fluid is then utilized to actuate a piston which will operate to compress the spring and release the braking force on the pack to allow rotation of the wheel about the spindle. Such an installation is desirable when a failsafe braking feature is intended. It should be clear from the disclosure presented hereinabove that a similar type of bore and piston configuration with the desired sealing could be utilized in such an installation without departing from the invention as claimed even though the piston would have to be oriented in a different direction for movement within the housing.

Having thus explained the basic operation and features of the improved brake 62, it is appropriate to examine the engineering instructions which are required for its manufacture as compared with the critical engineering tolerance and the manufacturing instructions mentioned hereinabove for the prior art brake 10. For the preferred brake 62 the only critical engineering tolerances required are those related to for the proper diameter of the interior cylindrical surface 84 of the bore 78 and the exterior cylindrical surface 92 of the piston 88. Additionally, during final finishing it is also important that acceptable surface smoothness be provided to the interior cylindrical surface 84 and the exterior cylindrical surface 92 for the proper operation of the seals 100, 102 thereon. Because of the design and operation of the seals 100, 102 no further critical engineering instructions or tolerances are required for the preferred brake 62. Even the tolerances between the cylindrical outer edge of the radially inwardly extending wall 86 and the interior cylindrical surface 84 are not critical since normal manufacturing tolerances will allow their proper mating. Since the seal 100 will prevent any leakage thereby which might otherwise escape between the radial wall 86 and the interior cylindrical surface 84, even when the backing plate 80 is joined to the cylindrical portion 82 no sealing is needed between these elements. Similarly, the fitting of the piston 88 at the interior cylindrical edge of the wall 86 is not critical and a gap in this region would again present no problems because of the operation of the seal 100. Similarly, at the other end of the chamber 98, the seal 102 will prevent the escape of hydraulic fluid between the interior cylindrical 84 and the outer periphery of the radially outwardly extending wall 94 of the piston 88 so that the mating of these elements can be produced with normal manufacturing tolerances.

The operation of the seals 100, 102 with their lips 104 being capable of sufficient outward expansion to produce the desired sealing allows the seals 100, 102 to be properly seated on the respective surfaces of the wall 86 and the annular surface 96 without their having to be final machined for any critical smooth surface requirements. It can therefore be seen that a summation of all of the critical engineering tolerance requirements and surface requirements for the preferred brake 62 are now reduced to a total of four in the form of the two critical diameters for and the surface conditions of the internal cylindrical surface 84 and the external cylindrical surface 92.

Accordingly, the introduction of the seals 100, 102 to a bore-piston configuration in the manner described hereinabove has significantly reduced the required engineering instructions and tolerance requirements and therefore would be expected to significantly reduce the overall cost of manufacturing the brake. Although the present invention contemplates using the seals 100, 102 in a unique manner, the seals themselves are not that unique and any number of type of such seals might be utilized in the manner described hereinabove. For example, there are such seals disclosed in U.S. Pat. Nos. 3,169,776; 3,653,672; 3,738,665; 3,851,888; and 4,013,299. It should be clear from the disclosure presented hereinabove, that any number of alterations might be made to the preferred embodiment in the form of brake 62 without departing from the invention as claimed.

I claim:

1. An improved brake for relatively rotating first and second members of the type which includes a housing secured to said first member, a plurality of brake discs carried by said housing for relative rotation therewith and axial movement therein, a plurality of reaction plates carried by said second member for relative rotation therewith and axial movement thereon, and said discs and said plates being intervened in alternating fashion to define a pack, said improvement comprising:

said housing having a central bore defined by a radially, inwardly extending annular wall and an interior cylindrical surface;

a piston having a tubular portion with an exterior cylindrical surface and a radially, outwardly extending wall having an annular surface extending outwardly from said cylindrical outer surface;

said piston being axially, slidably mounted in said bore with said annular wall, said interior cylindrical surface, said exterior cylindrical surface and said annular surface defining an expandable chamber between said bore and said piston;

a first generally U-shaped expandable seal in said chamber being seated against said annular wall of said bore and having a pair of lips capable of respectively making sliding, sealing contact with said interior cylindrical surface and said exterior cylindrical surface; a second generally U-shaped expandable seal in said chamber being seated against said annular surface of said piston and having a pair of lips capable of respectively making sliding, sealing contact with said interior cylindrical surface and said exterior cylindrical surface;

means for selectively introducing hydraulic fluid to and discharging said hydraulic fluid from an intermediate region of said chamber between said first and said second seals, said hydraulic fluid being sealingly retained therein by said first and said second seals and capable of acting on said piston for selective movement of said piston axially relative to said bore; and means for providing a compressive braking force to said pack being responsive to said selective movement of said piston.

2. The improved brake as set forth in claim 1, wherein said piston and said bore are manufactured with a limited number of critical engineering instructions including those related to the diameter and the smoothness of said interior cylindrical surface, and the diameter and smoothness of said external cylindrical surface.

3. The improved brake as set forth in claim 1, wherein said tubular portion has an end remote from said annular wall of said bore aligned with said pack to provide said compressive braking force thereto.

4. The improved brake as set forth in claim 3, further including biasing means mounted within said housing in alignment with said piston tending to axially move said piston relative to said bore away from said pack, said hydraulic fluid being capable of overcoming said biasing means to provide said compressive braking force to said pack.

5. The improved brake as set forth in claim 3, wherein said end of said tubular portion of said piston includes a radially inwardly extending shoulder.

* * * * *